United States Patent Office 3,135,295
Patented June 2, 1964

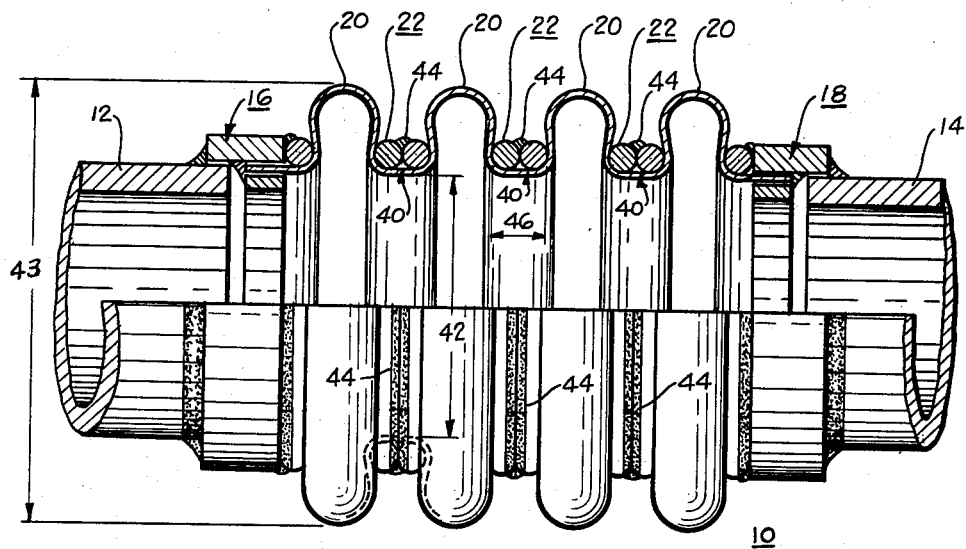
FIG_1
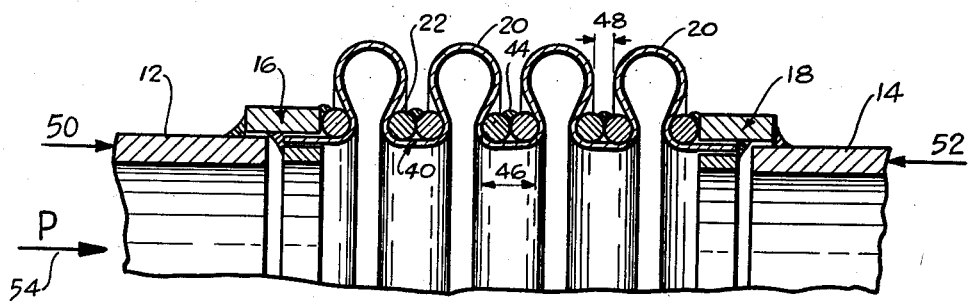
FIG_2
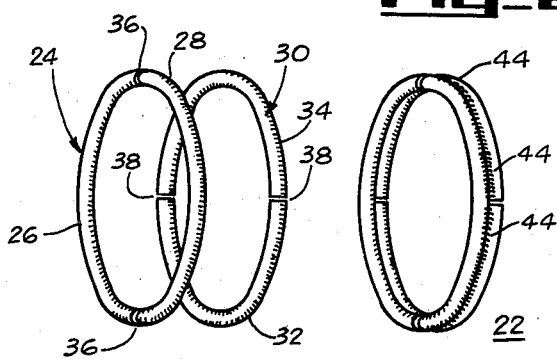
FIG_3  FIG_4
INVENTOR.
EUGENE H. ZIEBOLD.
BY
ATTORNEY

3,135,295
BELLOWS EXPANSION UNIT UTILIZING
SUPPORT RINGS
Eugene H. Ziebold, 5711 La Jolla Blvd.,
La Jolla, Calif.
Filed Nov. 9, 1961, Ser. No. 151,268
1 Claim. (Cl. 138—121)

This invention relates to bellows expansion units used as expansion joints in high pressure or high temperature gas or fluid pipe distribution systems. More particularly the present invention relates to a construction utilizing support or root rings intermediate each of the convolutions or bellows spans, of the expansion unit.

In certain high pressure or high temperature, or both, uses of expansion joints for accepting pipe line motion, it has been found that support is necessary or desirable intermediate the bellows spans of the expansion unit. Support or root rings of various types have been used to accomplish this result. Further, it has been known that the use of such rings gives support not only to the root area of the bellows intermediate adjacent convolutions or bellows spans, but also provides a limitation of motion with respect to adjacent bellows spans or convolutions. The motion thus limited of adjacent bellows spans permits them to be held apart from each other to enhance continuing motion relative to each other. The construction of the support or root rings in prior art has been varied and difficult. Some rings were attempted to be placed in the corrugating operations. Others were bolted in place after corrugations were formed. All these constructions attempted to avoid reheating the bellows metals because stress relief thereafter is difficult to achieve.

The present invention overcomes the disadvantages of the prior art, and achieves the desired result of enhancing operability and motion of the bellows unit, through the use of a new and improved support or root ring construction. In the present invention there is positioned intermediate each of the bellows or corrugated spans and in the root or trough between them, a pair of multi-piece rings. Each of the rings is placed adjacent the other and is thereafter welded one ring to the other ring to form all of the pieces into a unitary structure. The inventive construction is simple and may make use of ordinary round stock steel of any type of steel desired. The welding is accomplished at surfaces away from the bellows metal. Cooling fluids may be passed through the bellows metal to carry the heat transferred as a result of the welding away from the bellows metal, to prevent unwanted stress formations in the bellows.

Each of the multipieced rings may have at least two half-circle sections. These half circle sections of each ring may be placed in the adjacent ring construction for instance in quadrature one with another within the root or trough intermediate the bellows. Thus one-half circle of one ring overlaps the splits of the adjacent ring. The two rings, their halves in quadrature one with the other, are welded by ordinary welding at the juncture between the two rings. The weld is formed around the entire circumference of the adjacent areas of both of these rings. The weld, therefore, unites two rings and each of their pieces together as a single unit. The single unit provides both a minimum trough diameter and a lateral limiting dimension between the bellows. The lateral dimension may be selected at rest position of the bellows so as to give sufficient clearance between the bellows, when they are at their extreme in motion, usually, in compression, and still give a dimension sufficient so that adjacent bellows do not touch. For purposes of this specification "expansion" and "contraction" should be equivalent expressions indicating relative motions of one bellows span with respect to the next adjacent bellows span.

While the prior art has also placed rings about the trough or root intermediate bellows, another of its difficulties has been the inability to evenly distribute the hoop-stress of the rings used evenly over the entire ring circumference. Some of the prior art has previously only concentrated them in selected areas where the rings are bolted together. The present invention, of course, distributes the hoop-stress over the entire circumference of both rings enhancing the limits of operation considerably.

In addition to the aforementioned objects and advantages, it is also an object of this invention to provide an improved yet simplified construction of an expansion unit utilizing root rings or support rings.

It is another object of the present invention to provide an expansion unit with support rings which rings are simply positioned upon the bellows unit after the corrugating process of the bellows has been completed, in such a manner so as to subject the bellows unit to minimal additional heat variation, thereby reducing additional stressing of the bellows metal.

It is another object of the present invention to provide support rings for a bellows expansion unit intermediate the bellows which support rings may be constructed from ordinarily available round stock steel.

It is another object of the present invention to provide support rings as aforestated, which may be readily and easily assembled by relatively inexperienced personnel in an assembly line process.

It is another object of the present invention to provide a support rings structure for a fabricated bellows expansion unit, which considerably enhances motion absorption and continues to be flexible to permit further movement after considerable pressurization which support rings maintain the tubular shape of the convolutions providing the ideal shape for pressure containment for a tube or pipe.

Objects and advantages other than those set forth above will be apparent from the following description when read in connection with the accompanying drawing in which:

FIGURE 1 is a view in elevation, the upper half of which is in section, showing the bellows unit utilizing and embodying the present invention, the bellows unit being shown in an "at rest" or neutral position;

FIGURE 2 is a view in partial section, exaggerating somewhat the compression of the bellows when pipe movement is in compression and along the axis, and when the internal portion of the bellows and pipes is under pressure, exemplifying the action of the support rings intermediate the bellows;

FIGURE 3 is a view in perspective of the unassembled two multi-piece rings each utilizing at least two cooperating partial rings, and shows the partial rings displacement in quadrature with those of the other ring;

FIGURE 4 is a view in perspective showing the two multi-piece rings after they are welded into a unitary structure at their adjoining surfaces.

Referring more particularly to FIGURE 1, there is shown therein an expansion unit 10, exemplarily connected to pipe lines 12 and 14 through attachment means 16 and 18. The expansion unit 10 comprises a plurality of like bellows spans 20 which are shown in an "at rest" or neutral condition. Intermediate each of the bellows spans 20 is disposed a unitary multi-ring structure 22.

The multi-ring structure 22 in its basic concept is shown in FIGURE 3 as a multi-piece ring 24. Ring 24 may have at least two half sections of cooperating partial rings 26, 28. The second ring 30 is constructed exactly the same for this exemplification as the first ring 24. Second ring 30 also is comprised of two half section partial cooperating rings 32, 34. The split or gap 36 or ring 24 and split 38 of ring 30, are exemplarily placed in quadrature one with the other, so that the solid portions of rings 24 and 30 cover the splits 36 and 38, thus enhancing the overall structure. The two rings 24, 30 must be initially composed of sections or partial rings to permit assembly with the formed corrugations. Rings 24, 30 may be split in at least halves or may be in greater number of splits than halves if so desired. The insertion of the rings between the formed bellows span 20, in the trough or root section 40, intermediate adjacent bellows span 20, requires partial rings. Rings 24, 30 further are so placed about the root section 40 so as to encompass it in a loose fitting relation therewith and be placed side by side one with respect to the other.

The trough or root diameter 42 is less than the outer diameter 43, of the bellows spans 20, and is the minimal diameter between adjacent bellows spans 20. The inner diameter of the ring 24 and its adjoining ring 30, therefore, each have about the dimension but are slightly larger than the trough diameter 42 to provide the loose fit with its circumferential diameter substantially less than the outer diameter. The rings 24, 30 are then placed in the trough 40 intermediate the bellows spans 20, so as to have their openings 36 and 38 angularly rotated, one from the other. While any angularity may be utilized, they are exemplified as being in quadrature. As shown in FIGURE 4, weld means 44 is then provided at the adjacent surfaces of the adjoining rings joining the rings into a unitary structure 22. The unitary structure 22 has a lateral dimension 46 so chosen as to provide, as shown in FIGURE 2, a desired root or trough lateral dimension 46. Dimension 46 is so selected as to provide sufficient distance 48 between adjoining or adjacent bellows spans 20, so that when maximum expected compressive forces, symbolized by arrows 50, 52, are brought to bear by pipes 12 and 14 against the bellows expansion unit 10, that the adjacent bellows spans retain at least a minimal dimension 48 between them. Maintaining of minimal dimension 48 permits flexibility and movement with respect to adjacent bellows spans 20.

The added application of pressure 54 in the internal portion of the expansion unit 10 and its conduction of fluid or gas, is further enhanced even in the compressive state of the unit 10 shown in FIGURE 2, by the support ring unitary structure 22, in that the support rings 22 limit the convolutions of bellows spans 20 in their internal configuration to a somewhat tubular shape, thus enhancing the ability of the unit to act as a pressure container for fluid and gases flowing therethrough at the same time. The tubular shape of course, is ideal for pressure containment as it follows Barlow's formula $$t = \frac{PD}{2S}$$

for the tubular shape or pipe. A lesser lateral dimension than that provided by dimension 46 would give the desired distance 48 between adjacent bellows spans 20, and would cause the bulge of adjacent bellows spans 20 to touch, thus prohibiting any further expanding motion of the expansion unit 10. The support rings 22 with their minimal dimension 46 of course enhance the operation of the bellows unit in the extremes of compression and aid in permitting additional compression. There are also cases in expansion, where with other motion absorption by the unit, the operation thereof is likewise enhanced. Therefore for this specification, expansion and contraction are treated as similar in motion as affects the utility of the support rings on the bellows unit.

In the practice of the present invention, the multi-piece ring 24, as well as identical ring 30, may have a rectangular, triangular, octangular or other cross-section, but is preferably shown and used in a circular cross section configuration. The partial rings 26, 28 of the multi-piece ring 24 are shown as only two pieces of the multipiece ring 24, and could, if desired, be made of more than two pieces, and still be within the ambit of the present invention.

The particular embodiment of the invention illustrated and described is illustrative only, and the invention includes such other modifications and equivalents as may readily appear to those skilled in the art, within the scope of the appended claim.

I claim:

A bellows expansion unit comprising a plurality of corrugated spans, each of the spans having an outer diameter and having a trough between each pair of adjoining spans, a first ring comprising at least two cooperating partial-rings, said first ring having an inner diameter of about the diameter of said trough and a circumferential diameter substantially less than said outer diameter, a second ring identical with the said first ring, each of said rings having a cross section such that there is a valley formed between their outer surfaces, both of said rings being disposed in side-by-side relation contiguous with one another in the trough between a pair of adjoining spans, each pair of said rings having their partial-rings disposed in angularity one with another, and a fully circumferential weld on the outer surface of said rings and located in the valley between said side-by-side rings, said weld joining said rings together into a unitary structure.

References Cited in the file of this patent
UNITED STATES PATENTS

| | | |
|---|---|---|
| 581,343 | Frank | Apr. 27, 1897 |
| 582,804 | Billings et al. | May 18, 1897 |
| 1,615,591 | Mallory | Jan. 25, 1927 |
| 1,733,455 | Ferrand | Oct. 29, 1929 |
| 2,314,776 | Dittus et al. | Mar. 23, 1943 |
| 2,412,271 | Kercher | Dec. 10, 1946 |
| 2,573,530 | Zallea et al. | Oct. 30, 1951 |
| 2,818,636 | Fentress et al. | Jan. 7, 1958 |
| 2,822,194 | Fentress | Feb. 4, 1958 |
| 2,886,885 | Reid | May 19, 1959 |